(12) United States Patent
Snell

(10) Patent No.: US 11,283,735 B2
(45) Date of Patent: Mar. 22, 2022

(54) CONTEXTUAL AWARENESS FROM SOCIAL ADS AND PROMOTIONS TYING TO ENTERPRISE

(71) Applicant: Verint Americas Inc., Alpharetta, GA (US)

(72) Inventor: Jennifer L. Snell, Spokane Valley, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 48 days.

(21) Appl. No.: 16/849,289

(22) Filed: Apr. 15, 2020

(65) Prior Publication Data

US 2020/0336442 A1 Oct. 22, 2020

Related U.S. Application Data

(60) Provisional application No. 62/835,555, filed on Apr. 18, 2019.

(51) Int. Cl.
*G06Q 30/00* (2012.01)
*H04L 51/02* (2022.01)
*G06Q 30/02* (2012.01)
*G06Q 50/00* (2012.01)

(52) U.S. Cl.
CPC .......... *H04L 51/02* (2013.01); *G06Q 30/01* (2013.01); *G06Q 30/0244* (2013.01); *G06Q 30/0253* (2013.01); *G06Q 30/0255* (2013.01); *G06Q 50/01* (2013.01)

(58) Field of Classification Search
CPC .... H04L 51/02; G06Q 30/01; G06Q 30/0244; G06Q 30/0253; G06Q 30/0255; G06Q 50/01
See application file for complete search history.

(56) References Cited

U.S. PATENT DOCUMENTS

| 10,721,189 | B1* | 7/2020 | Gau ..................... H04L 51/32 |
| 2009/0030800 | A1* | 1/2009 | Grois ................. G06Q 30/0277 |
| | | | 705/14.52 |
| 2014/0245140 | A1 | 8/2014 | Brown et al. |

(Continued)

OTHER PUBLICATIONS

Intelligent Virtual Assistant (IVA) Market is Expect to Reach US $11.3 Billion by 2024, Web Newswire, May 20, 2019 (Year: 2019).*

(Continued)

*Primary Examiner* — Matthew L Hamilton
(74) *Attorney, Agent, or Firm* — Meunier Carlin & Curfman LLC

(57) ABSTRACT

Systems and methods for incorporating intelligent virtual assistants into advertisements on social networking platforms are provided. When a user interacts with a content item, an intelligent virtual assistant is selected and put into contact with the user. The intelligent virtual assistant is provided with a context that includes information about the user in the social networking platform, information about the user in a customer relationship management platform, and information about the product, service, or entity associated with the content item. The context allows the intelligent virtual assistant to converse with the user in a way that feels natural and relevant to the user and allows the intelligent virtual assistant to answer any questions about the product, service, or entity associated with the content item.

16 Claims, 5 Drawing Sheets

(56) References Cited

U.S. PATENT DOCUMENTS

| | | | |
|---|---|---|---|
| 2016/0044380 A1 | 2/2016 | Barrett | |
| 2017/0324868 A1 | 11/2017 | Tamblyn et al. | |
| 2017/0364965 A1* | 12/2017 | Kannan | G06F 16/954 |
| 2018/0234545 A1 | 8/2018 | Barak et al. | |
| 2018/0300337 A1* | 10/2018 | Thomas | G06F 16/24578 |
| 2018/0300414 A1* | 10/2018 | Chen | G06F 3/048 |
| 2018/0376002 A1* | 12/2018 | Abraham | H04M 3/5166 |
| 2019/0019077 A1 | 1/2019 | Griffin et al. | |
| 2019/0043106 A1* | 2/2019 | Talmor | G06N 3/006 |
| 2019/0065839 A1 | 2/2019 | Kavikkal et al. | |
| 2019/0068526 A1* | 2/2019 | Xie | H04L 67/20 |
| 2019/0087865 A1* | 3/2019 | Loree | G06Q 50/01 |
| 2019/0182382 A1* | 6/2019 | Mazza | G10L 15/26 |

OTHER PUBLICATIONS

Garnett, Lindsey, Are Chatbots Here to Stay?, Multichannel Direct Advertising, Jan. 2018 (Year: 2018).*

International Search Report and Written Opinion, dated Jul. 7, 2020, received in connection with International Patent Application No. PCT/US2020/028209.

* cited by examiner

100

CONTEXTUAL AWARENESS FROM SOCIAL ADS AND PROMOTIONS TYING TO ENTERPRISE

CROSS-REFERENCE TO RELATED APPLICATIONS

This application claims the benefit of priority to U.S. Provisional Patent Application No. 62/835,555, filed on Apr. 18, 2019, entitled "Contextual Awareness from Social Ads and Promotions Tying to Enterprise," the contents of which are hereby incorporated by reference in its entirety.

BACKGROUND

In marketing, millions of dollars are spent on advertising and promoting on social networking platforms, but there is only a 2-3% average conversion rate. One solution to this problem is the use of chat bots to engage with the users and increase the conversion rate. However, current chat bots are limited in scale and use rigid decision tree flows. As a result, the chat bots cannot interact with users in a way that appears natural. Furthermore, even though the social networking platform allows the targeting of advertisements to users based on information such as user profiles, little of this information is made available to the chat bots.

SUMMARY

Systems and methods for incorporating intelligent virtual assistants into advertisements on social networking platforms are provided. When a user interacts with a content item (e.g., an advertisement), an intelligent virtual assistant is selected and put into contact with the user. The intelligent virtual assistant is provided with a context that includes information about the user in the social networking platform (e.g., a user profile), information about the user in a customer relationship management platform, and information about the product, service, or entity associated with the content item. The context allows the intelligent virtual assistant to converse with the user in a way that feels natural and relevant to the user and allows the intelligent virtual assistant to answer any questions about the product, service, or entity associated with the content item.

In an embodiment, a method for operating an intelligent virtual assistant is provided. The method includes: receiving an indication of a user interaction with a content item for a user by a computing device; in response to the indication, selecting an intelligent virtual assistant to interact with the user by the computing device; and establishing a communication channel between the intelligent virtual assistant and the user by the computing device.

Embodiments may include some or all of the following features. The content item may be a content item in a social networking platform. The method may further include: determining a brand, a product, or a service associated with the content item; and selecting the intelligent virtual assistant based on the determined brand, product, or service. The method may further include: generating a context for the user; and providing the generated context to the intelligent virtual assistant. Generating the context may include: retrieving data associated with the user from a social networking platform; and generating the context based on the retrieved data. Generating the context may include: retrieving data associated with the user from a customer relationship management (CRM) platform; and generating the context based on the retrieved data. Generating the context may include: retrieving data entered by the user into the content item or provided by the user to a chat bot; and generating the context based on the retrieved data. The communication channel may include one or more of a telephone communication channel, an application communication channel, and a short message service (SMS) communication channel. The content item may be an advertisement.

In an embodiment, a system for operating an intelligent virtual assistant is provided. The system includes at least one processor and a memory storing instructions. The instructions when executed by the at least one processor cause the at least one processor to: receive an indication of a user interaction with a content item for a user; in response to the indication, select an intelligent virtual assistant to interact with the user; and establish a communication channel between the intelligent virtual assistant and the user.

Embodiments may include some or all of the following features. The content item may be a content item in a social networking platform. The instructions further comprise instructions that when executed by the at least one processor cause the at least one processor to: determine a brand, a product, or a service associated with the content item; and select the intelligent virtual assistant based on the determined brand, product, or service. The instructions further comprise instructions that when executed by the at least one processor cause the at least one processor to: generate a context for the user; and provide the generated context to the intelligent virtual assistant. Generating the context may include retrieving data associated with the user from a social networking platform; and generating the context based on the retrieved data. Generating the context may include: retrieving data associated with the user from a CRM platform; and generating the context based on the retrieved data. Generating the context may include: retrieving data entered by the user into the content item or provided by the user to a chat bot; and generating the context based on the retrieved data. The communication channel may include one or more of a telephone communication channel, an application communication channel, and an SMS communication channel. The content item may be an advertisement.

In an embodiment, a non-transitory computer readable medium is provided. The computer readable medium includes instructions that, when executed by at least one processor, cause the at least one processor to: receive an indication of a user interaction with a content item for a user; in response to the indication, select an intelligent virtual assistant to interact with the user; and establish a communication channel between the intelligent virtual assistant and the user.

Embodiments may include some or all of the following features. The content item may be a content item in a social networking platform.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments.

however, the embodiments are not limited to the specific methods and instrumentalities disclosed. In the drawings.

DETAILED DESCRIPTION

Figure 1:
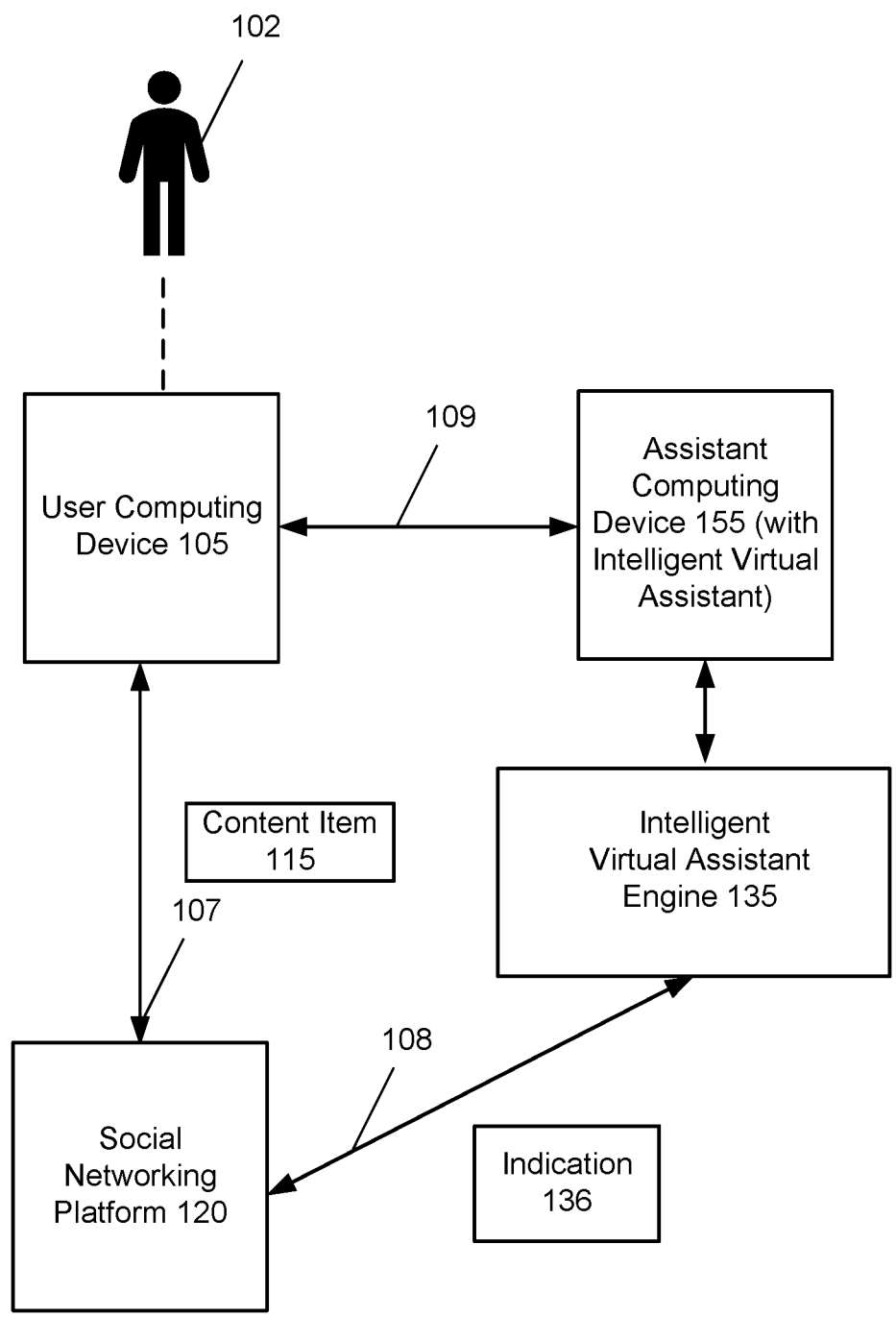
FIG. 1 is an illustration of an exemplary environment for providing an intelligent virtual assistant.

FIG. 1 is an illustration of an exemplary environment 100 for operating an intelligent virtual assistant. A user 102, using a user computing device 105 such as smartphone, tablet, or laptop computer communicates with a social networking platform 120 through a network 107 (e.g., the internet). A social networking platform 120 may be a service or application that allows users to communicate and share information with each other. Examples of suitable social networking platforms 120 include Facebook, Instagram, and Twitter. Other social networking platforms 120 may be supported.

The social networking platform 120 may provide targeted content items 115 to users 102. The content items 115 may be advertisements and may include image content items 115 and video content items 115. As described above, the content items 115 provided to a user 102 may be targeted specifically to the user 102 based on a profile and other information collected about the user 102 by the social networking platform 120. This type of advertising is generally known as targeted advertising.

In order to leverage the data used for targeted advertising for use by intelligent virtual assistants, the environment 100 includes an intelligent virtual assistant engine 135. When the user 102 interacts with a content item 115 (e.g., clicks on the content item 115), an indication 136 of the interaction is generated by the social networking platform 120 and provided to the intelligent virtual assistant engine 135 through a network 108 (e.g., the internet). The network 108 may the same network, or a different network, as the network 109.

Figure 2:
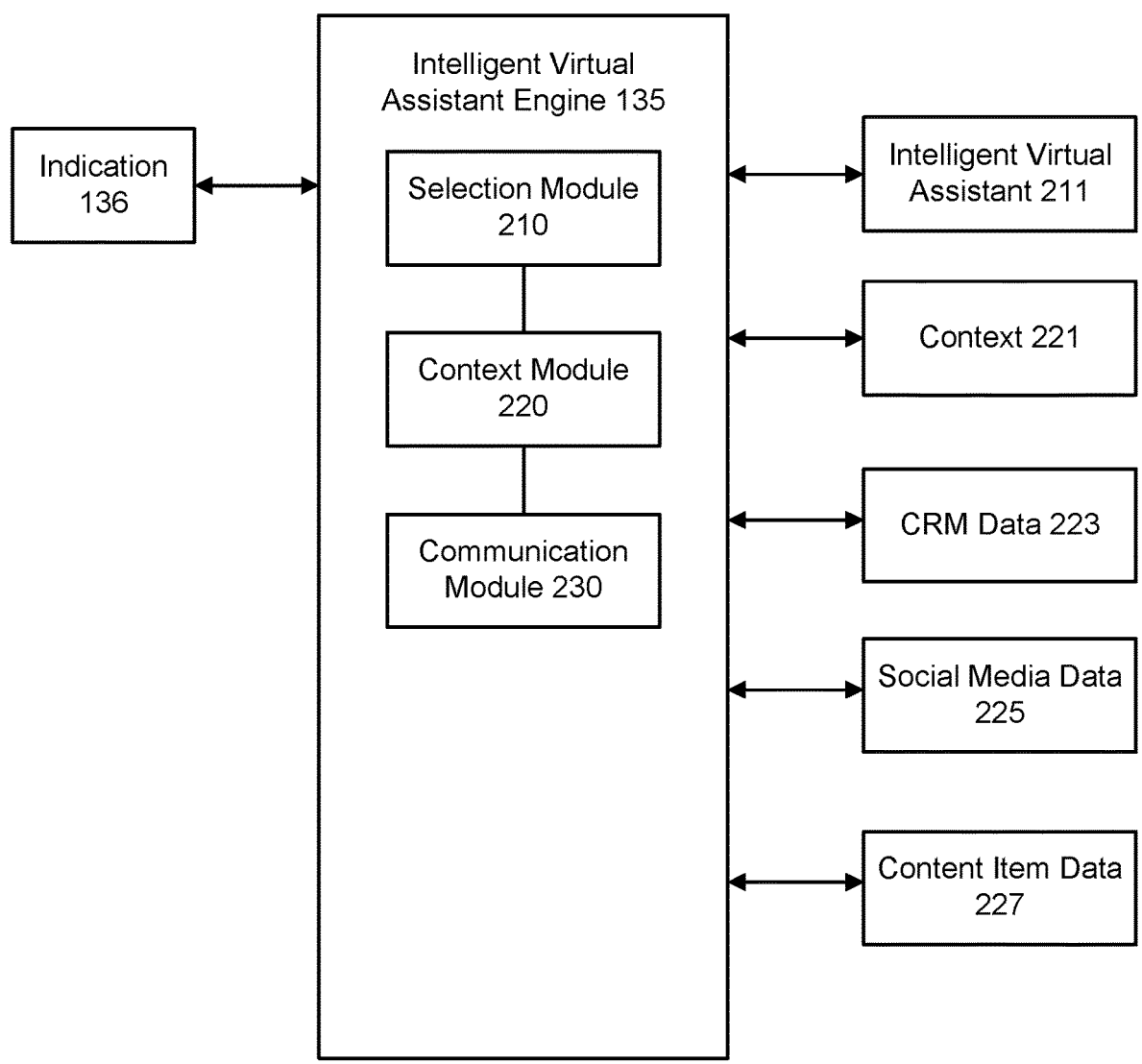
FIG. 2 is an illustration of an example intelligent virtual assistant engine.

As described further respect to FIG. 2, the intelligent virtual assistant engine 135 may receive additional data about the user 102 and/or the content item 115 from the social networking platform 120. This information may include some or all of the information was used to target the content item 115 to the user 102. The intelligent virtual assistant engine 135 may use this information to teach an intelligent virtual assistant about the user 102 and the product, service, or brand associated with the content item 115.

The intelligent virtual assistant engine 135 may cause the intelligent virtual assistant to be executed by an assistant computing device 155 and may establish a communication channel 109 between the user computing device 105 and the assistant computing device 155 through which the user 102 and the intelligent virtual assistant may communicate. Example communication channels 109 include telephone, email, SMS, and browser or application-based communication channels (e.g., pop-up windows).

As may be appreciated, the intelligent virtual assistant engine 135 provides many advantages over the prior art. Because the intelligent virtual assistant engine 135 uses data about the user 102 from the social networking platform 120 and the content item 115, the user is provided with a personalized intelligent virtual assistant experience. In addition, this data also allows for a faster experience for the user 102 because much of the data that the intelligent virtual assistant would have to collect from the user (e.g., name, address, age, and interests) may already be provided by the social networking platform. Further, the intelligent virtual assistant engine 135 saves money and resources by tying into existing social networking advertising campaigns which have been proven to be successful.

FIG. 2 is an illustration of an example interactive voice assistant engine 135. As shown, the interactive voice assistant engine 135 includes one or more modules including a selection module 210, a context module 220, and a communication module 230. More or fewer modules may be supported. Some or all of the modules of the intelligent virtual assistant engine 135 may be implemented together or separately by the computing device 500 illustrated with respect to FIG. 5.

The selection module 210 may receive an indication 136 of an interaction with a content item 115 by a user 102. The content item 115 may be a content item 115 displayed or shown to a user by a social networking platform 120. The content item 115 may be an advertisement that was selected to display to the user 102 by the social networking platform 120. The advertisement may be an image or a video. Any type of advertisement may be supported.

Depending on the embodiment, the user 102 may interact with the content item 115 by selecting the content item 115. For example, the user may click or touch the content item 115 in the social networking platform 120. In another embodiment, the user 102 may interact with the content item 115 by providing data to the content item 115. For example, the content item 115 may include fields through which the user 102 may provide information such as their name, address, or age, for example. In another embodiment, the user may interact with the content item 115 by watching or viewing the content item 115. For example, the content item 115 may be a video that automatically plays when it is determined that the user 102 is looking at the content item 115.

The selection module 210 may select an intelligent virtual assistant 211 in response to receiving the indication 136 of interaction with the content item 115. An intelligent virtual assistant 211 is a software-based virtual assistant that is able to interact with a user 102 as well as answer questions received from the user 102 regarding a particular subject or topic. Depending on the embodiment, the intelligent virtual assistant 211 may be able to facilitate purchases of items or services, as well as make reservations for the user 102.

The selection module 210 may select an intelligent virtual assistant 211 based on one or more of an entity, brand, product, or service associated with the content item 115. For example, the content item 115 associated with the indication 136 may be an advertisement for a cruise, and the selection module 210 may select an intelligent virtual assistant 211 associated with the particular cruise ship or cruise line. The intelligent virtual assistant 211 may have been trained to answer questions related to the cruise ship or cruise line and to take reservations for the cruise ship or cruise line.

In another example, if the content item 115 associated with the indication 136 is an advertisement for a drug, the selection module 210 may select an intelligent virtual assistant 211 associated with the drug or a manufacturer of the drug. The intelligent virtual assistant 211 may have been trained to answer questions related to the drug and to ask appropriate questions to determine if the user 102 is a candidate for the drug.

After selecting the intelligent virtual assistant 211, the context module 220 may generate a context 221 that may be used by the selected intelligent virtual assistant 211 to personalize the interaction between the intelligent virtual assistant 211 and the user 102. The context 221 may include the name of the user 102, location or address of the user 102, demographic information about the user 102, and any other information that may be used to personalize the interaction with the intelligent virtual assistant 211 and the user 102.

In some embodiments, the context module 220 may generate the context 221 using customer relationship management (CRM) data 223 associated with the user. Depending on the embodiment, the context module 220 may retrieve CRM data 223 associated with the user 102 from a CRM platform or application. The CRM data 223 may include contact information associated with the user 102 (e.g., phone number or email address) and other information such as an order history associated with the user 102. Any information or data that is typically stored for a user 102 by a CRM platform may be used.

In some embodiments, the context module 220 may generate the context 221 using social media data 225. The social media data 225 may include information about the user from the social networking platform 120 that the user interacted with the content item 115 using. The information may include information about the user 102 from a profile associated with the user 102 in the social networking platform 120, posts or content items 115 generated or published by the user 102 on the social networking platform 120 and likes or other indicators of engagement on the social networking platform 120. Other information may be included in the social media data 225. Depending on the embodiment, the context module 220 may receive the social media data 225 from the social networking platform 120 or may scrape or otherwise extract the social media data 225 from the social networking platform 120.

In some embodiments, the context module 220 may further generate the context 221 using content item data 227. The content item data 227 may include data about the content item 115 that the user 102 interacted with as well as any information that the user 102 provided to the content item 115. For example, the content item data 227 may include the name of the entity, brand, product, or service associated with the content item 115, any information entered by the user 102 into a field associated with the content item 115, and any questions or other information provided by the user 102 to a chat bot associated with the content item 115.

The context module 220 may provide the generated context 221 to the selected intelligent virtual assistant 211. The intelligent virtual assistant 211 may then use the context 221 to communicate with the user 102. For example, the intelligent virtual assistant 211 may use the context 221 to determine the name of the user 102, interests of the user 102, and other interactions that the user 102 had with the brand associated with the content item 115. The intelligent virtual assistant 211 may then include this information in the conversation with the user 102.

The communication module 230 may establish a communication channel 109 between the user and the intelligent virtual assistant 211. Depending on the embodiment, the communication channel 109 may be related to the communication channel 109 used by the user 102 to interact with the content item 115. For example, if the user 102 used a web browser to interact with the content item 115 and the social networking platform 120, the communication module 230 may establish the communication channel 109 by opening a browser window or pop-up for the intelligent virtual assistant 211 and the user 102 to converse through.

In some embodiments, the communication channel 109 may be based on information provided by the user 102 while interacting with the content item 115. For example, the user 102 may have provided a phone number in a field associated with the content item 115. The communication module 230 may then establish the communication channel 109 by calling the user 102 at the provided phone number.

In some embodiments, the communication channel 109 may be based on CRM data 223 associated with the user 102. For example, the CRM data 223 may indicate that the user 102 prefers to communicate via SMS message at a particular number. The communication module 230 may then establish the communication channel 109 by texting the user 102 at the particular number.

In some embodiments, the communication channel 109 may be based on social media data 225 associated with the user 102. For example, a profile of the user 102 in the social networking platform 120 may have an email address listed for the user 102. The communication module 230 may then establish the communication channel 109 by emailing the user 102 at the email address.

The systems and methods described herein may be used for a variety of applications. As one example, a pharmaceutical company may run a targeted advertising campaign for a diabetes medication on a social networking platform 120. If a user 102 clicks on an advertisement, the user 102 is directed to a website where an intelligent virtual assistant 211 corresponding to the diabetes medication may begin interacting with the user 102. The intelligent virtual assistant 211 may state in a textual or audio form "Welcome Steve, I'm here to support you in learning about diabetes and the risks associated with it. Do you know someone who has recently been diagnosed with diabetes?" The name of the user 102 may be provided to the intelligent virtual assistant 211 as part of the context 221.

In another example, an electronics retailer may advertise a specific laptop model on a social networking platform 120. A user may click on a "shop now" element of the advertisement, which causes an intelligent virtual assistant 211 to launch. The intelligent virtual assistant 211 may receive a context 221 that includes the name of the user and information about the particular laptop, which allows the intelligent virtual assistant 211 to refer to the user by name and answer any questions about the laptop that the user may have.

In another example, an airline may run a promotion on a social networking platform 120 for a trip to Puerto Vallarta. A user may click on a "book now" element of the advertisement, which causes an intelligent virtual assistant 211 to launch. The intelligent virtual assistant 211 may receive a context 221 that includes the name of the user and other information about the user such as their frequent flyer number, their preferred airport, and preferred type of seat (e.g., first class vs. coach, window vs. aisle). The intelligent virtual assistant 211 may then use the context 221 to recommend flights for upcoming dates to the user and may even allow the user to book one or more flights through the intelligent virtual assistant 211.

Figure 3:
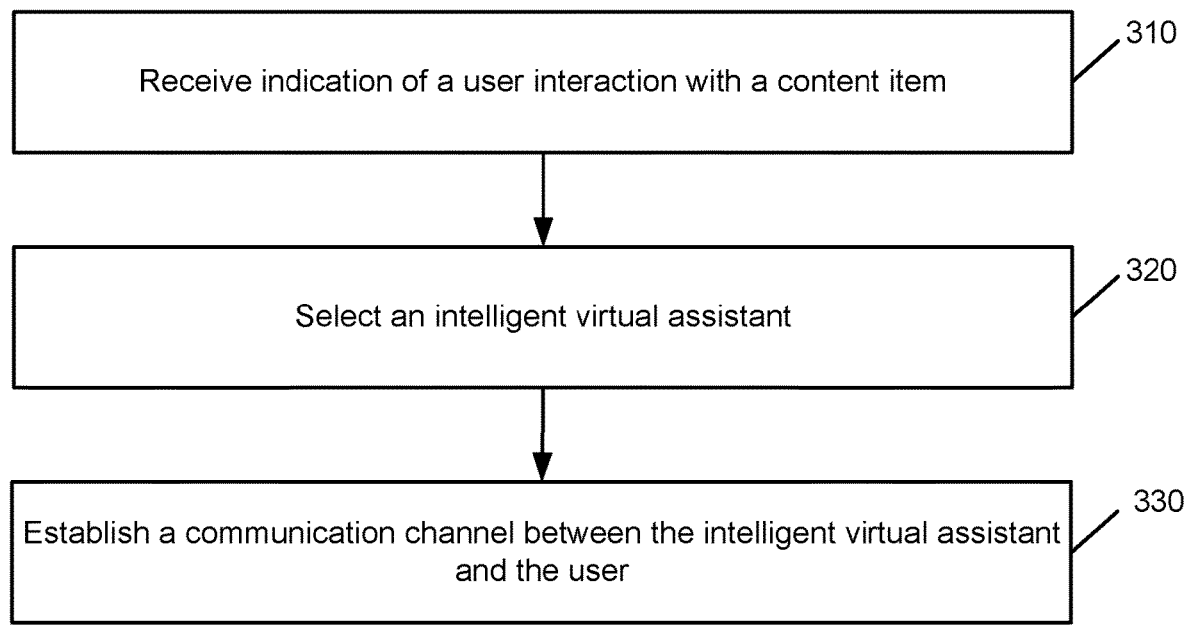
FIG. 3 is an operational flow of an implementation of a method for establishing a communication between an intelligent virtual assistant and a user.

FIG. 3 is an illustration of an exemplary method 300 for establishing a communication channel between a user 102 and an intelligent virtual assistant 211. The method 300 may be implemented by the intelligent virtual assistant engine 135.

At 310, an indication of a user interaction with a content item is received. The indication 136 may be received by the selection module 210 of the intelligent virtual assistant engine 135. In some embodiments, the indication 136 may be received from a social networking platform 120 in response to the user 102 interacting with a content item 115 presented to the user 102 in the social networking platform 120. For example, the content item 115 may be displayed to the user 102 in a personalized feed provided by the social networking platform 120. Depending on the embodiment, the user 102 may have interacted with the content item 115 by selecting or clicking on the content item 115. Other types of interactions may be supported.

At 320, an intelligent virtual assistant is selected. The intelligent virtual assistant 211 may be selected by the selection module 210. Depending on the embodiment, the intelligent virtual assistant 211 may be selected based on a variety of factors including a brand or entity associated with the content item 115, or the communication channel 109 that the intelligent virtual assistant 211 will interact with the user 102 over. For example, each company may have an intelligent virtual assistant 211 trained to discuss the various brands, products, or services associated with the company. Alternatively, a single virtual assistant 211 may be used to service all users 102, and no selection may be necessary.

Depending on the embodiment, the intelligent virtual assistant 211 may also be provided with a context 221 that is based on the user 102. The context 221 may include information about the user 102 that the intelligent virtual assistant 211 may reference when communicating with the user 102. How the context 221 is created is described further with respect to FIG. 4.

At 330, a communication channel between the intelligent virtual assistant and the user is established. The communication channel 109 may be established by the communication module 230 of the intelligent virtual assistant engine 135. Depending on the embodiment, the channel 109 may be one or more of a telephone channel, an application channel, or an SMS channel. For example, the communication module 230 may call a telephone number associated with the user 102, and the user 102 and the intelligent virtual assistant 211 may communicate over the telephone. In another example, the communication module 230 may cause an application to download or open on a smartphone associated with the user 102, and the user 102 and the intelligent virtual assistant 211 may communicate through the application. In still another example, the communication module 230 may cause a browser window to open on a computing device associated with the user 102, and the user and the intelligent virtual assistant 211 may communicate through the window. Depending on the embodiment, the communication channel 109 may be selected based on the associated content item 115 or based on preferences or information provided by the user 102.

Figure 4:
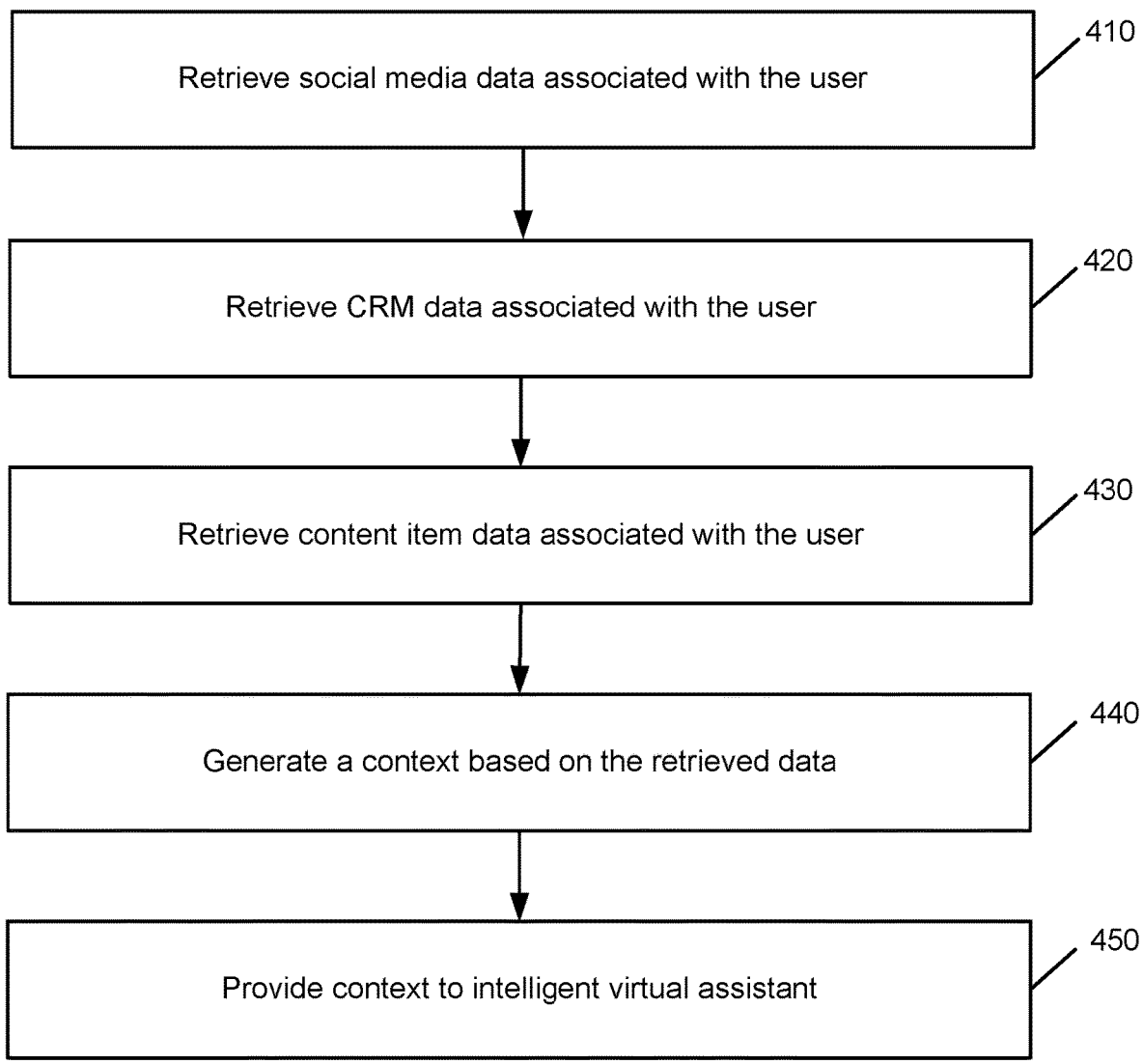
FIG. 4 is an operational flow of an implementation of a method for generating a context for an intelligent virtual assistant.

FIG. 4 is an illustration of an exemplary method 400 for generating a context for an intelligent virtual assistant. The method 400 may be implemented by the intelligent virtual assistant engine 135.

At 410, social media data associated with the user is retrieved. The social media data 225 may be retrieved by the context module 220. The user 102 may have interacted with a content item 115 provided on a social networking platform 120. Depending on the embodiment, the social media data 225 may include information about the user 102 from a social media profile associated with the user in the social networking platform 120 (e.g., name, age, marriage status, and interests), information posted or provided by the user 102 in the social networking platform 120 (e.g., posts, comments, "likes", images/videos, and linked articles), and information about friends of the user 102 in the social networking platform 120. The social media data 225 may be provided by the social networking platform 120 to the context module 220 or may be extracted or scraped from the social networking platform 120 by the context module 220.

At 420, CRM data associated with the user is retrieved. The CRM data 223 may be retrieved by the context module 220. The CRM data 223 may be retrieved by the context module 220 interfacing with a CRM platform and determining if there is any information associated with the user 102 in the CRM platform. The CRM data 223 may include a user profile (e.g., name, contact information, and demographic information) and an interaction history associated with the user 102 (e.g., an order history of the user and any previous calls, contacts, or interactions with the user 102).

At 430, content item data associated with the user is retrieved. The content item data 227 may be retrieved by the context module 220. The content item data 227 may include information about the content item 115 that user 102 interacted with. The content item data 227 may include the company, brand, product, or service associated with the content item 115, any information entered by the user 102 into the content item 115 (e.g., name, address, or contact information), and any information provided to a chat bot associated with the content item 115.

At 440, a context is generated from the retrieved data. The context 221 may be generated by the context module 220 using the retrieved data. Any method for generating a context 221 may be used.

At 450, the context is provided to an intelligent virtual assistant. The context 221 may be provided by the context module 220. The intelligent virtual assistant 211 may use the context 221 to communicate with the user 102 via the established communication channel 109.

Figure 5:
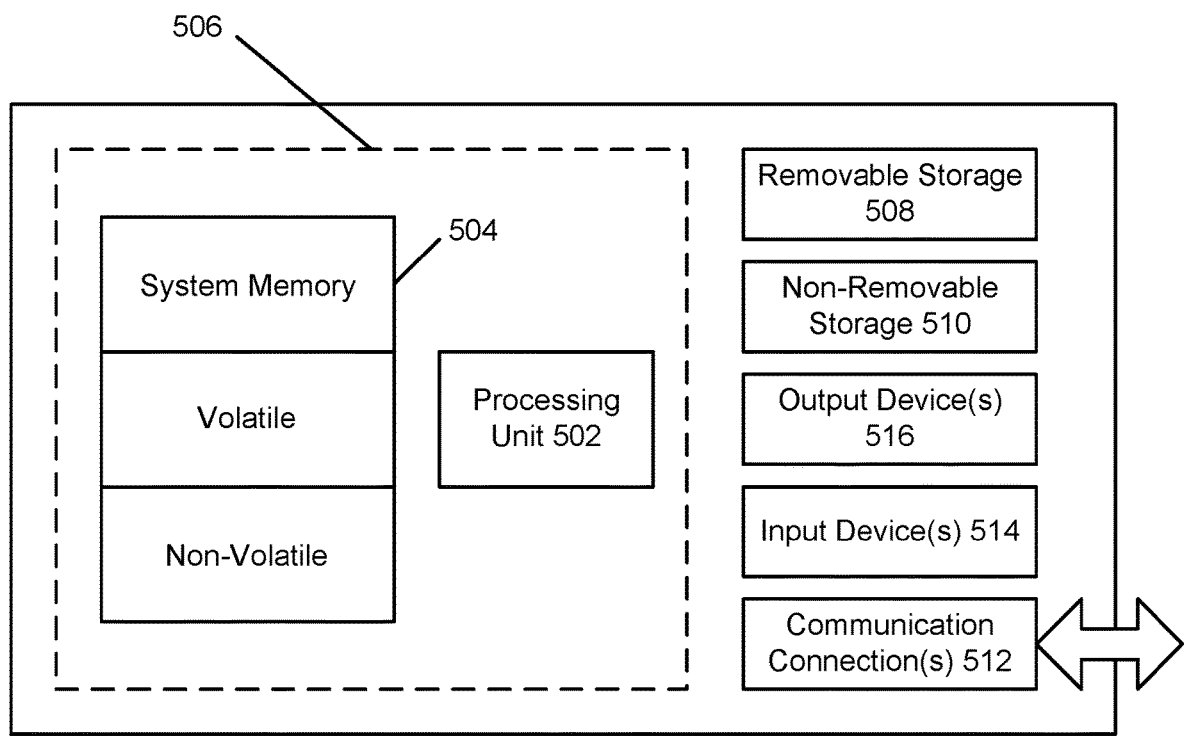
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for increasing engagement between users and intelligent virtual assistants comprising:
    receiving, by a first computing device, an indication of a user interaction with a content item for a user from a second computing device through a network, wherein the content item is associated with content item data;
    in response to the indication, selecting, by the first computing device, an intelligent virtual assistant of a plurality of virtual assistants to interact with the user based on the content item data;
    generating, by the first computing device, a context for the user, wherein the context includes the content item data;
    providing, by the first computing device, the generated context to the intelligent virtual assistant;
    selecting, by the first computing device, a communication channel from a plurality of communication channels based on the content item data; and
    establishing, by the first computing device, the selected communication channel between the intelligent virtual assistant and the second computing device through the network.

2. The method of claim 1, wherein the content item is a content item in a social networking platform.

3. The method of claim 1, wherein generating the context comprises:
    retrieving data associated with the user from a social networking platform; and
    generating the context based on the retrieved data.

4. The method of claim 1, wherein generating the context comprises:
    retrieving data associated with the user from a customer management relationship (CRM) platform; and
    generating the context based on the retrieved data.

5. The method of claim 1, wherein generating the context comprises:
    retrieving data entered by the user into the content item or provided by the user to a chat bot; and
    generating the context based on the retrieved data.

6. The method of claim 1, wherein the communication channel comprises one or more of a telephone communication channel, an application communication channel, and a short message service (SMS) communication channel.

7. The method of claim 1, wherein the content item is an advertisement.

8. A system for increasing engagement between users and intelligent virtual assistants comprising:
    at least one processor; and
    a memory storing instructions that when executed by the at least one processor cause the at least one processor to:

receive an indication of a user interaction with a content item for a user from a user computing device through a network, wherein the content item is associated with content item data;

in response to the indication, select an intelligent virtual assistant of a plurality of virtual assistants to interact with the user based on the content item data;

generate a context for the user, wherein the context includes the content item data;

provide the generated context to the intelligent virtual assistant;

select a communication channel from a plurality of communication channels based on the content item data; and establish a communication channel between the intelligent virtual assistant and the user computing device through the network.

9. The system of claim 8, wherein the content item is a content item in a social networking platform.

10. The system of claim 8, wherein generating the context comprises:

retrieving data associated with the user from a social networking platform; and generating the context based on the retrieved data.

11. The system of claim 8, wherein generating the context comprises:

retrieving data associated with the user from a customer management relationship (CRM) platform; and generating the context based on the retrieved data.

12. The system of claim 8, wherein generating the context comprises:

retrieving data entered by the user into the content item or provided by the user to a chat bot; and generating the context based on the retrieved data.

13. The system of claim 8, wherein the communication channel comprises one or more of a telephone communication channel, an application communication channel, and an SMS communication channel.

14. The system of claim 8, wherein the content item is an advertisement.

15. A non-transitory computer readable medium comprising instructions that, when executed by at least one processor, cause the at least one processor to:

receive an indication of a user interaction with a content item for a user from a user computing device through a network, wherein the content item is associated with content item data;

in response to the indication, select an intelligent virtual assistant of a plurality of virtual assistants to interact with the user based on the content item data; and generate a context for the user, wherein the context includes the content item data;

provide the generated context to the intelligent virtual assistant;

select a communication channel from a plurality of communication channels based on the content item data; and establish a communication channel between the intelligent virtual assistant and the user computing device through the network.

16. The computer readable medium of claim 15, wherein the content item is a content item in a social networking platform.

* * * * *